(12) United States Patent
Fujiwara

(10) Patent No.: US 7,795,919 B2
(45) Date of Patent: Sep. 14, 2010

(54) TRANSMITTER DRIVER CIRCUIT IN HIGH-SPEED SERIAL COMMUNICATIONS SYSTEM

(75) Inventor: Hideo Fujiwara, Takarazuka (JP)

(73) Assignee: Ricoh Company, Ltd., Tokyo (JP)

( * ) Notice: Subject to any disclaimer, the term of this patent is extended or adjusted under 35 U.S.C. 154(b) by 414 days.

(21) Appl. No.: 11/494,689

(22) Filed: Jul. 28, 2006

(65) Prior Publication Data

US 2007/0124518 A1 May 31, 2007

(30) Foreign Application Priority Data

Jul. 28, 2005 (JP) ............................. 2005-219172

(51) Int. Cl.
*H03K 19/00* (2006.01)
*H03K 19/096* (2006.01)
*H03K 17/16* (2006.01)

(52) U.S. Cl. .......................................... 326/87; 326/30
(58) Field of Classification Search ...................... None
See application file for complete search history.

(56) References Cited

U.S. PATENT DOCUMENTS

| | | | |
|---|---|---|---|
| 5,729,499 A | | 3/1998 | Fujiwara et al. |
| 5,737,273 A | | 4/1998 | Fujiwara et al. |
| 5,739,707 A | * | 4/1998 | Barraclough ................. 327/112 |
| 6,864,726 B2 | * | 3/2005 | Levin et al. ................... 327/112 |
| 6,894,543 B2 | * | 5/2005 | Ho et al. ....................... 327/108 |
| 7,227,382 B1 | * | 6/2007 | Talbot et al. ................... 326/87 |
| 7,307,447 B2 | * | 12/2007 | Clements et al. .............. 326/30 |
| 2004/0222821 A1 | * | 11/2004 | Ho et al. ........................ 327/65 |
| 2007/0103186 A1 | * | 5/2007 | Clements et al. .............. 326/30 |

FOREIGN PATENT DOCUMENTS

| | | |
|---|---|---|
| JP | 2002-325019 | 11/2002 |
| JP | 2004-88693 | 3/2004 |
| JP | 3547193 | 4/2004 |

* cited by examiner

*Primary Examiner*—Vibol Tan
*Assistant Examiner*—Dylan White
(74) *Attorney, Agent, or Firm*—Dickstein Shapiro LLP

(57) ABSTRACT

A driver circuit in a high-speed serial communications system changes an input data signal into a differential signal. A first output terminal is connected to a predetermined power supply voltage through a first pullup resistance circuit and to a grounding voltage through a first pulldown resistance circuit. A second output terminal is connected to the predetermined power supply voltage through a second pull-up resistance circuit and to the grounding voltage through a second pull-down resistance circuit. Resistances of the first and second pull-up resistance circuits and resistances of the first and second pulldown resistance circuits are changed according to the input data signal.

18 Claims, 10 Drawing Sheets

TRANSMITTER DRIVER CIRCUIT IN HIGH-SPEED SERIAL COMMUNICATIONS SYSTEM

CLAIM FOR PRIORITY

This patent specification is based on Japanese patent application, No. JP2005-219172 filed on Jul. 28, 2005 in the Japan Patent Office, the entire contents of which are incorporated by reference herein.

BACKGROUND OF THE INVENTION

1. Field of the Invention

The present invention generally relates to a driver circuit for use in a high-speed serial communications system, and more particularly to a driver circuit capable of reducing power consumption by effectively changing an inner resistance in accordance with an input data signal.

2. Discussion of the Background

Many electronic products are equipped with a high speed interface to allow high speed communication with other products. Accordingly, systems that use a high-speed serial communication system have been developed in recent years. A currently available high-speed serial communication to realize a high-speed data transmission is, for example, a low-voltage differential signal transmission (LVDS) system using a differential voltage signal of low amplitude, or a current mode logic (CML) system.

FIG. 1 illustrates a circuit diagram of an exemplary transmitter driver circuit 101 employed in a background high-speed serial communications system using the CML system. The background high-speed serial communications system produces a voltage amplitude conforming to a specific standard by applying a predetermined current to a terminating resistance which is provided to a reception end of a transmission line connected to the transmitter driver circuit 101. For example, the background high-speed serial communications system provided for a serial ATA (Advanced Technology Attachment) needs to produce a voltage amplitude of 250 mV. As another example, the high-speed serial communications system provided for PCI-Express needs to produce a voltage amplitude of 330 mV.

This type of background high-speed serial communications system is provided with a pre-emphasis function which increases a voltage amplitude at a transmission of predetermined data in contemplation of a damping characteristic of a signal in a transmission line. FIG. 2 illustrates a circuit diagram of an exemplary transmitter driver circuit 102 having an emphasis function. In FIG. 2, the transmitter driver circuit 102 activates both constant-current generators Ic101 and Ic102 at a time of pre-emphasis but activates only the constant-current generator Ic101 at a time other than the pre-emphasis.

The background high-speed serial communications system is provided with an output driver which typically includes a first driver and a second driver. The first driver includes a signal input end and a signal output end. The first driver has a specific output impedance predefined in accordance with a characteristic impedance of a transmission line of a signal transmission media. The second driver is connected to the first driver in parallel and is configured to receive and to amplify a signal in response to an input control signal.

The background high-speed serial communications system is further provided with a differential data driver circuit which typically includes a first pre-drive circuit, a delay circuit, a second pre-drive circuit, and an output driver circuit. The first pre-drive circuit receives differential data. The delay circuit receives a differential data signal and is used for pre-emphasis in which a lag time of the differential data signal is variable according to a control signal. The second pre-drive circuit receives an output signal of the delay circuit. The output driver circuit outputs a drive current having a pre-emphasis waveform equivalent to a difference signal representing a difference between output signals of the first pre-drive circuit and the second pre-drive circuit.

BRIEF SUMMARY OF THE INVENTION

In one embodiment, a transmitter driver circuit in a high-speed serial communications system capable of reducing power consumption is provided.

In one embodiment, the driver circuit includes a first output terminal and a second output terminal to output signal which is changed from a data signal from outside into a differential signal. The first output terminal is connected to a predetermined power supply voltage through a first pull-up resistance circuit and the first output terminal is also connected to a grounding voltage through a first pulldown resistance circuit. The second output terminal is connected to a predetermined power supply voltage through a second pull-up resistance circuit and the second output terminal is also connected to a grounding voltage through a second pulldown resistance circuit. Resistances of the first and the second pull-up resistance circuits and resistances of the first and the second pulldown resistance circuits change according to the data signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
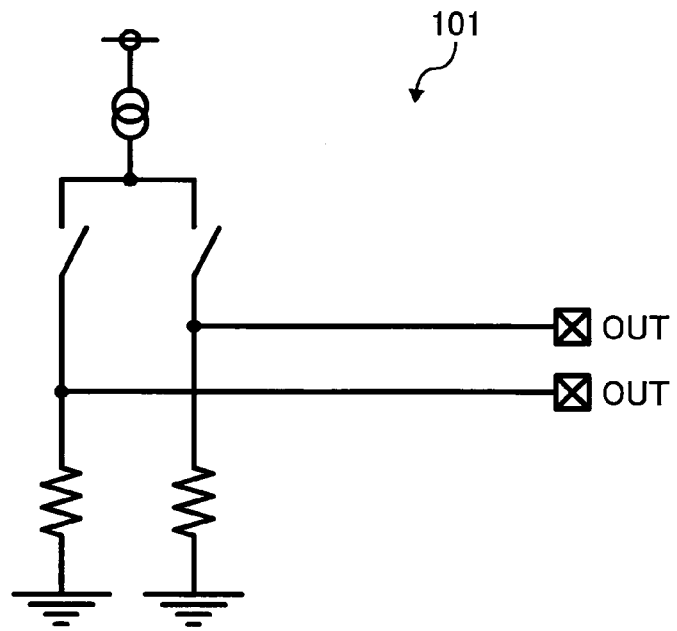
FIG. 1 illustrates an example of a circuit diagram of a background transmitter driver circuit in a high-speed serial communications system.
Figure 2:
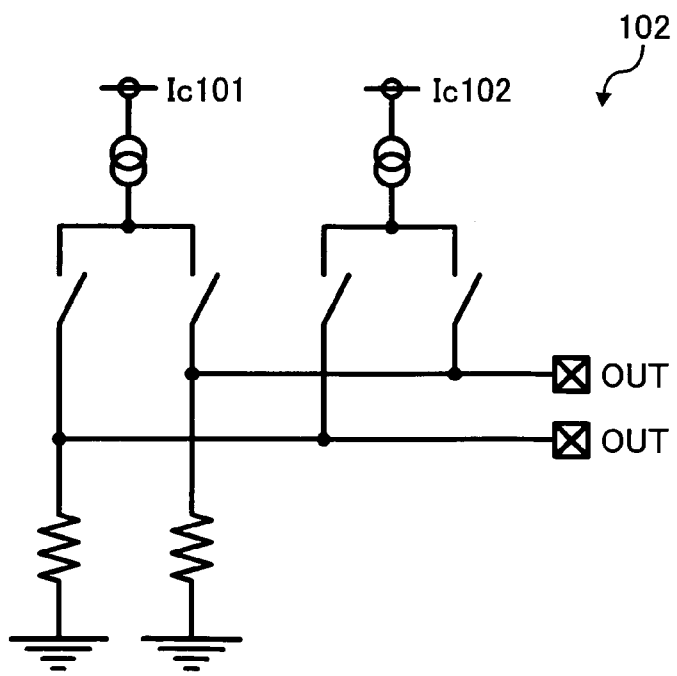
FIG. 2 illustrates another example of a background transmitter driver circuit having an emphasis function.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a high-speed serial communications system including a driver circuit according to an embodiment of the present invention is explained.

Figure 3:
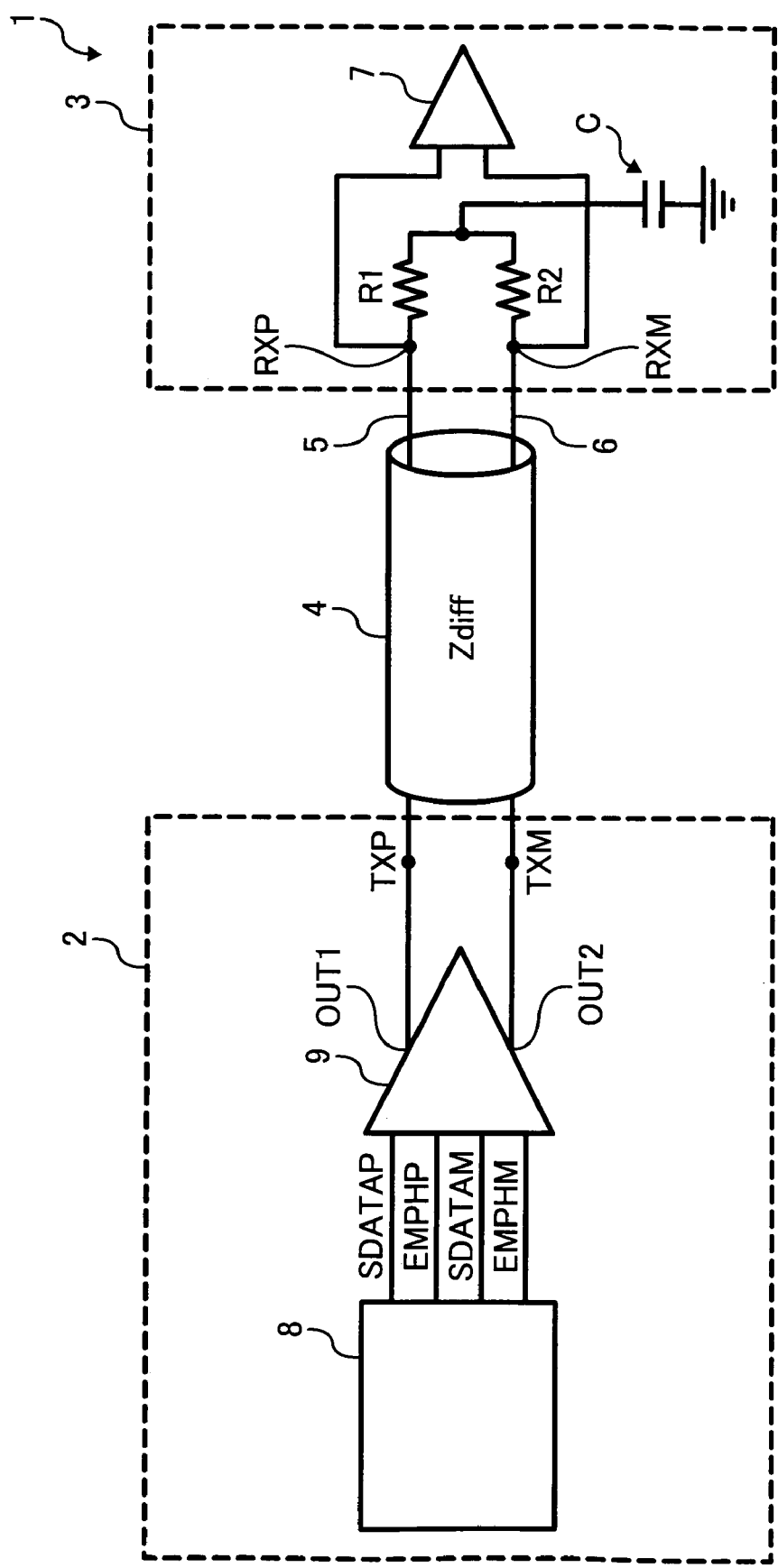
FIG. 3 illustrates an exemplary configuration of a high-speed serial communications system using a transmitter driver circuit according to an embodiment of the present invention.

FIG. 3 illustrates an exemplary configuration of a high-speed serial communications system of PCI-Express using a transmitter driver circuit according to an embodiment of the present invention. As shown in FIG. 3, a high-speed serial communications system 1 includes a transmitter circuit 2, a receiver circuit 3, and a differential transmission line 4. The differential transmission line 4 is configured with an outward trip transmission line 5 and an inward trip transmission line 6 between the transmitter circuit 2 and the receiver circuit 3. The receiver circuit 3 includes two resistances R1 and R2 which are terminating resistances of the differential transmission line 4, a receiving circuit 7, and a capacitor C. Two input ends of the receiving circuit 7 are connected to the differential transmission line 4. A connected point of one input end of the receiving circuit 7 and the outward trip transmission line 5 is defined as "RXP", and a connected point of the input end of the other side of the receiving circuit 7 and the inward trip transmission line 6 is defined as "RXM." The resistances R1 and R2 are connected in series between the two points RXP and RXM, and the connected point of the resistances R1 and R2 is connected to a grounding voltage GND through the capacitor C. The capacitor C acts as a bypass capacitor.

The transmitter circuit 2 includes a digital circuit 8 and a driver circuit 9. Two output ends OUT1 and OUT2 of the driver circuit 9 are connected to the outward trip transmission line 5 and the inward trip transmission line 6, respectively. A connected point of the output end OUT1 and the outward trip transmission line 5 is defined as "TXP", and a connected point of the output end OUT2 and the inward trip transmission line 6 is defined as "TXM." The digital circuit 8 generates a pair of serial-data signals SDTAP and SDATAM which have an opposite signal level, a pair of emphasis control signals EMPHP and EMPHM which have an opposite signal level, and outputs them into the driver circuit 9. The driver circuit 9 converts the serial-data signals SDTAP and SDTAM from the digital circuit 8 into analog differential signals of low amplitude, and outputs the signals to the outward trip transmission line 5 and the inward trip transmission line 6, respectively.

The transmitter circuit 2 transmits the analog differential signal to the receiver circuit 3 through the differential transmission line 4. The differential signal is input into the receiving circuit 7. The resistances R1 and R2 are terminating resistances for impedance adjustment in the receiver circuit 3. A voltage amplitude of the differential signal transmitted on the differential transmission line 4 is determined by the values of the resistances R1 and R2. In a high-speed serial communications system, the differential impedance Zdiff in the differential transmission line 4 may be 100Ω, and the each resistance of R1 and R2 may be 50Ω. The impedance adjustment may improve the signal quality, in case the differential signal of low amplitude is transmitted and received on the differential transmission line 4.

Figure 4:
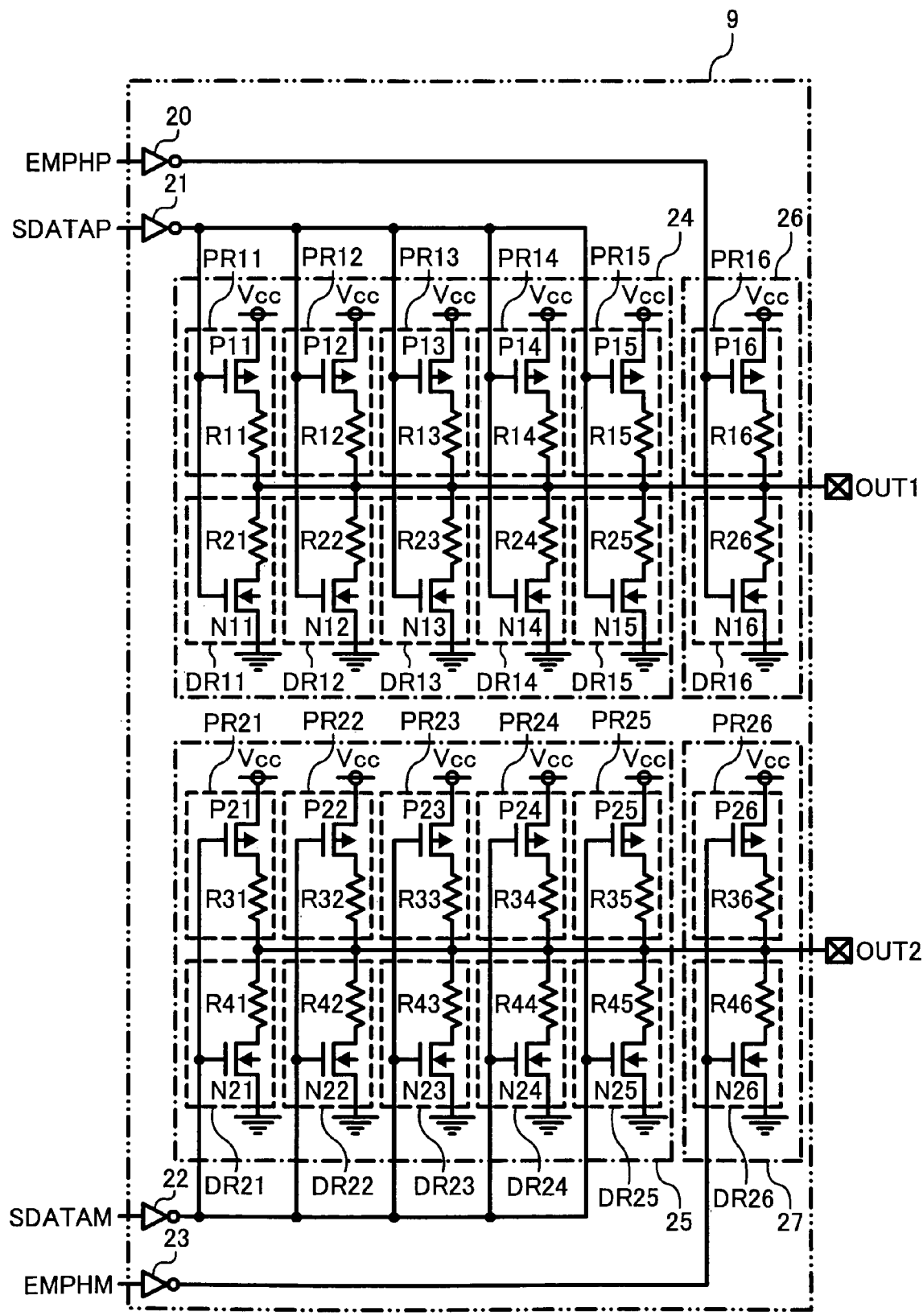
FIG. 4 illustrates a detailed exemplary configuration of a circuit of the driver circuit of FIG. 3.

FIG. 4 illustrates a detailed exemplary configuration of a circuit diagram of the driver circuit 9 of FIG. 3. The driver circuit 9 includes four inverters 20, 21, 22, and 23, two data generation circuits 24 and 25, and two emphasis control circuits 26 and 27. The output ends of inverters 20 and 23 are connected to the input ends of the emphasis control circuits 26 and 27, respectively. The output ends of inverters 21 and 22 are connected to the input ends of the data generation circuits 24 and 25, respectively. The output ends of the data generation circuit 24 and the emphasis control circuit 26 constitute an output end OUT1. The output ends of the data generation circuit 25 and the emphasis control circuit 27 constitute an output end OUT2.

The data generation circuit 24 includes five first partial resistance circuits PR11, PR12, PR13, PR14, and PR15, which collectively make up a first pullup resistance circuit, connected in parallel between the output end OUT1 and a predetermined power supply voltage Vcc. The data generation circuit 24 also includes five second partial resistance circuits DR11, DR12, DR13, DR14, and DR15, which collectively make up a first pulldown resistance circuit, connected in parallel between the output end OUT1 and the GND. Each first partial resistance circuits PR11, PR12, PR13, PR14, and PR15 has the same configuration. Each second partial resistance circuit DR11, DR12, DR13, DR14, and DR15 has the same configuration. The first partial resistance circuit PR11 has a configuration in which a P type metal oxide film field effect transistor (PMOS transistor) P11 and a resistance R11 are connected in series. The second partial resistance circuit DR11 has a configuration in which an N type metal oxide film field effect transistor (NMOS transistor) N11 and a resistance R21 are connected in series. The gates of the transistors P11, P12, P13, P14, P15, N11, N12, N13, N14, and N15 are connected to the output end of the inverter 21.

The data generation circuit 25 includes five first partial resistance circuits PR21, PR22, PR23, PR24, and PR25, which collectively make up a second pullup resistance circuit, connected in parallel between the output end OUT2 and the predetermined power supply voltage Vcc. The data generation circuit 25 also includes five second partial resistance circuits DR21, DR22, DR23, DR24, and DR25, which collectively make up a second pulldown resistance circuit, connected in parallel between the output end OUT2 and the GND. The first partial resistance circuits PR21, PR22, PR23, PR24, and PR25 have the same composition. The second partial resistance circuits DR21, DR22, DR23, DR24, and DR25 have the same composition. The first partial resistance circuit PR21 has a configuration in which a PMOS transistor P21 and a resistance R31 are connected in series. The second partial resistance circuit DR21 has a configuration in which an NMOS transistor N21 and a resistance R41 are connected in series. The gates of the transistors P21, P22, P23, P24, P25, N21, N22, N23, N24, and N25 are connected to the output end of the inverter 22.

The emphasis control circuit 26, includes a third pullup resistance circuit, which is the first partial resistance circuit PR16 in which a PMOS transistor P16 and a resistance R16 are connected in series between the output end OUT1 and the predetermined power supply voltage Vcc. The emphasis control circuit 26 also includes a third pulldown resistance circuit, which is the second partial resistance circuit DR16 in which an NMOS transistor N16 and a resistance R26 are connected in series between the output end OUT1 and the GND. The gates of the transistors P16 and N16 are connected to the output end of the inverter 20.

The emphasis control circuit 27 includes a fourth pullup resistance circuit, which is the first partial resistance circuit PR26 in which a PMOS transistor P26 and a resistance R36 are connected in series between the output end OUT2 and the predetermined power supply voltage Vcc. The emphasis control circuit 27 also includes a fourth pulldown resistance circuit, which is the second partial resistance circuit DR26 in which an NMOS transistor N26 and a resistance R46 are connected in series between the output end OUT2 and the GND. Each gate of the transistors P26 and N26 is connected to the output end of the inverter 23. The emphasis control circuits 26 and 27 control the amplitude of the differential signal transmitted on the differential transmission line 4. In order to prevent a high frequency loss in the differential transmission line 4, the voltage amplitude of the differential signal is increased at the time of the pre-emphasis. For example, each resistance of the resistances R11, R12, R13, R14, R15, R16, R21, R22, R23, R24, R25, R26, R31, R32, R33, R34, R35, R36, R41, R42, R43, R44, R45, and R46 may be 300Ω.

Figure 5:
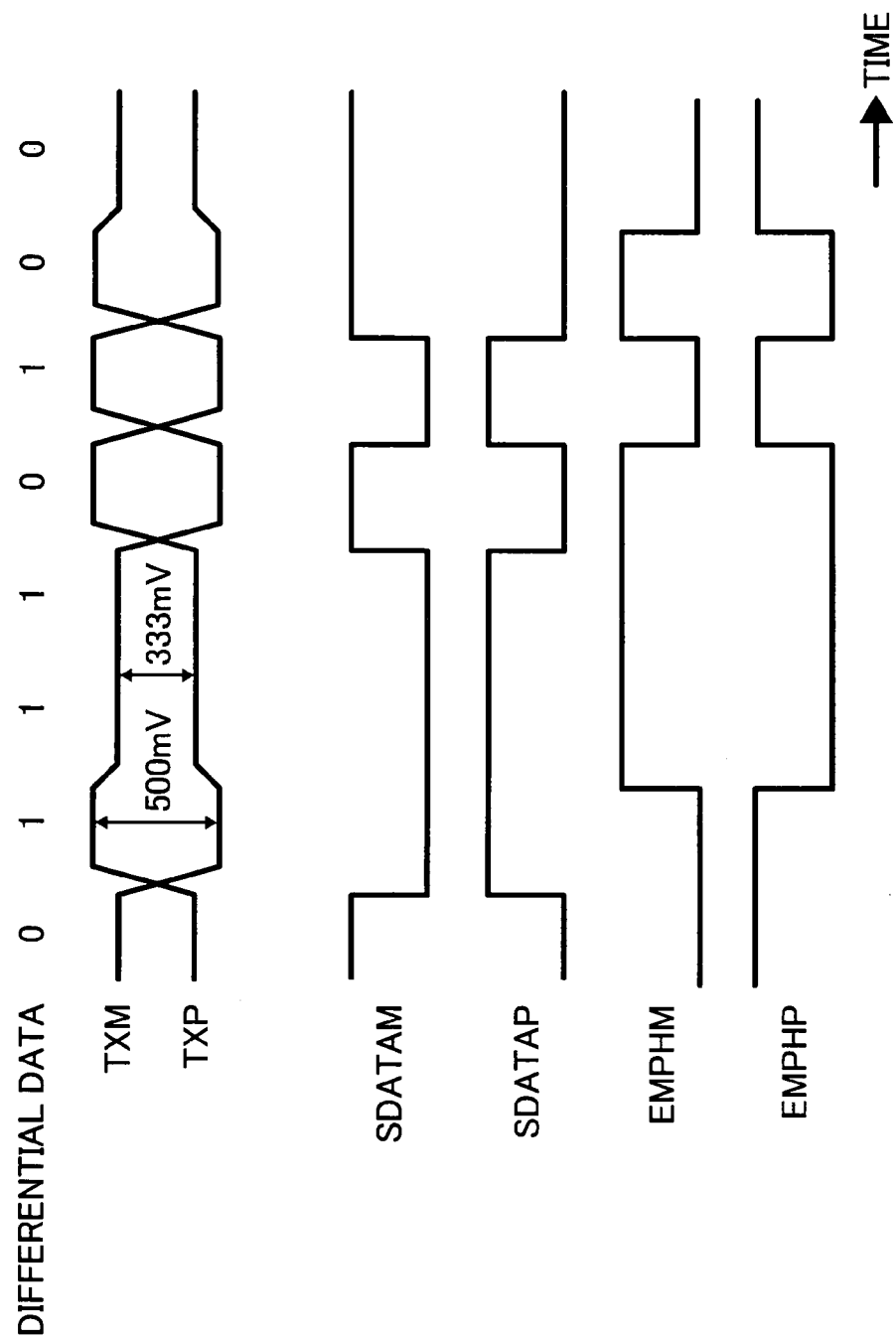
FIG. 5 is a timing chart for the driver circuit of FIG. 3.

FIG. 5 is a timing chart for explaining an embodiment of a method of operation of the driver circuit 9 of FIG. 3. In FIG. 5, "TXP" and "TXM" show waveforms of the differential voltage output to the points TXP and TXM. In the high-speed communication serial system of PCI-Express, for example, the amplitude of the differential voltage at the time of pre-emphasis is 500 mV, and the amplitude of the differential voltage at the time of de-emphasis is 333 mV. "SDATAM", "SDATAP", "EMPHM", and "EMPHP" show waveforms of digital signals SDATAM, SDATAP, EMPHM, and EMPHP which are output from the digital circuit 8. "Differential data" is differential data output to the differential transmission line 4 according to the serial-data signals SDTAP and SDTAM. When the serial-data signal SDATAM is at a High level and the serial-data signal SDATAP is at a Low level, differential data "0" is output. When the serial-data signal SDATAM is at a Low level and the serial-data signal SDATAP is at a High level, differential data "1" is output.

At the time of pre-emphasis, the signal level of the serial-data signal SDATAM and the emphasis control signal EMPHM are in agreement, and the signal level of the serial-data signal SDATAP and the emphasis control signal EMPHP are in agreement. As shown in FIG. 5, when the differential data changes from "0" to "1" and the next differential data output is also "1", the signal level of the emphasis control signal EMPHM changes from a Low level to a High level and the signal level of the emphasis control signal EMPHP changes from a High level to a Low level. When the differential data changes from "1" to "0" and the next differential data output is also "0", the signal level of the emphasis control signal EMPHM changes from a High level to a Low level and the signal level of the emphasis control signal EMPHP changes from a Low level to a High level. In this way, when the differential data is output from the driver circuit 9 in the order of "0, 1, 0", the second "0" is always output in the state of pre-emphasis, and when the differential data is output in the order of "1, 0, 1", the second "1" is always output in the state of pre-emphasis. When the differential data changes continuously, the differential signal on the differential transmission line 4 is in the pre-emphasis state and the amplitude becomes large. In this way the high frequency loss in the differential transmission line 4 may be reduced.

At the time of the pre-emphasis of data "1", the serial-data signal SDATAM is at a Low level and the serial-data signal SDATAP is at a High level, and the emphasis control signal EMPHM is at a Low level and the emphasis control signal EMPHP is at a High level. With reference to FIG. 4, the serial-data signal SDATAP output from the digital circuit 8 reverses the signal level through the inverter 21. The voltage of the reversed signal is applied to each gate of the PMOS transistors P11, P12, P13, P14, and P15 and the NMOS transistors N11, N12, N13, N14, and N15. The emphasis control signal EMPHP output from the digital circuit 8 reverses the signal level through the inverter 22. The voltage of the reversed signal is applied to the gate of the PMOS transistor P16 and the NMOS transistor N16. This causes the PMOS transistors P11, P12, P13, P14, P15, and P16 to be in the on state, and the NMOS transistors N11, N12, N13, N14, N15, and N16 to be in the off state. Therefore, the point TXP is pulled up.

The serial-data signal SDATAM output from the digital circuit 8 reverses the signal level through the inverter 22. The voltage of the reversed signal is applied to the gates of the PMOS transistors P21, P22, P23, P24, and P25 and the NMOS transistors N21, N22, N23, N24, and N25. The emphasis control signal EMPHM output from the digital circuit 8 reverses the signal level through the inverter 23. The voltage of the reversed signal is applied to the gates of the PMOS transistor P26 and the NMOS transistor N26. This causes the PMOS transistors P21, P22, P23, P24, P25, and P26 to be in the off state, and the NMOS transistors N21, N22, N23, N24, N25, and N26 to be in the on state. Therefore, the point TXM is pulled down.

Figure 6:
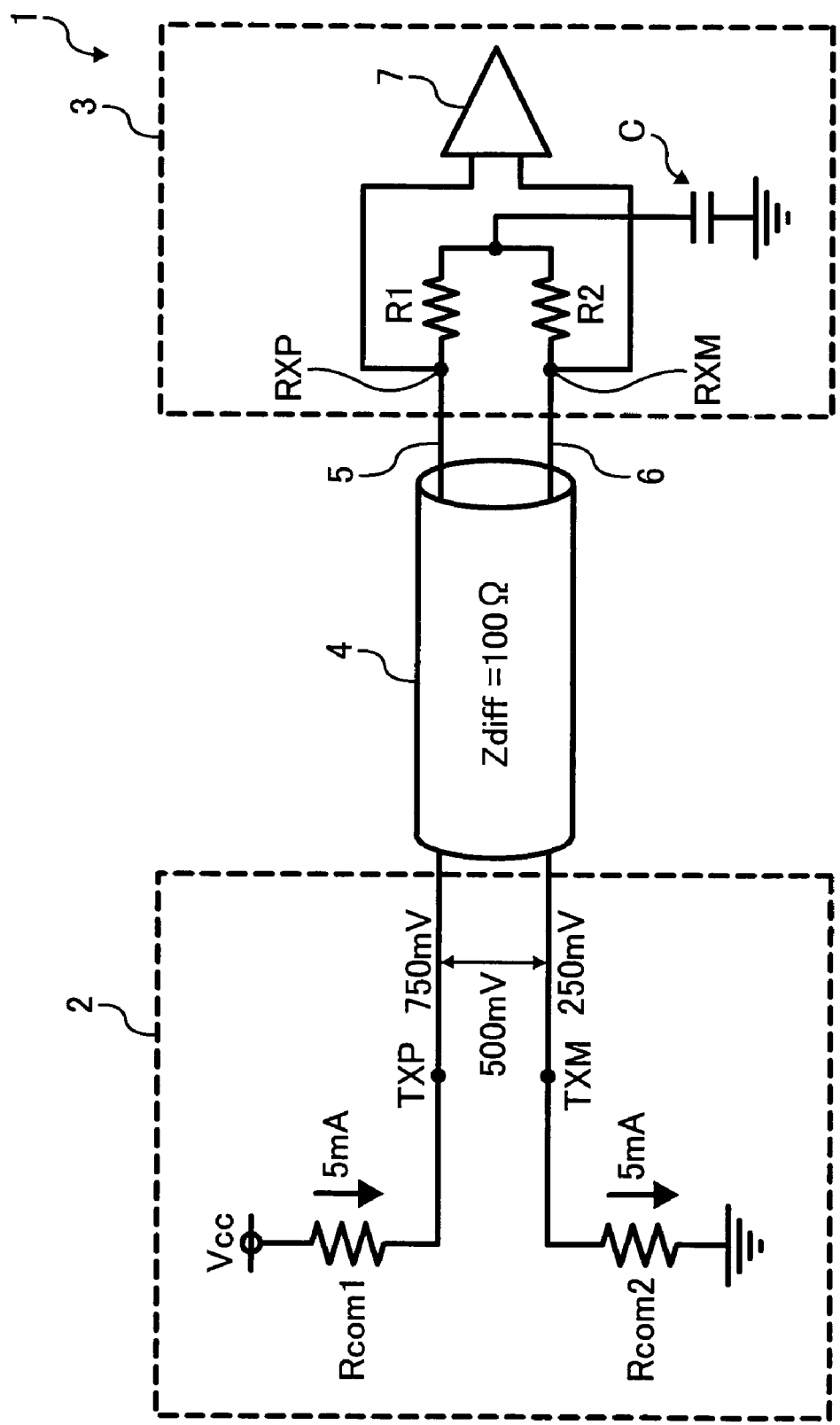
FIG. 6 is an illustration of the high-speed serial communications system of FIG. 3 at the time of the pre-emphasis of data "1."

FIG. 6 is an illustration explaining a state of the high-speed serial communications system 1 at the time of the pre-emphasis of data "1." As mentioned above, at the time of the pre-emphasis of data "1", all the PMOS transistors P11, P12, P13, P14, P15, and P16 of the data output circuit 24 and the emphasis control circuit 26 are in the on state, and all the NMOS transistors N11, N12, N13, N14, N15, and N16 are in the off state. Therefore, the six first partial resistance circuits PR11, PR12, PR13, PR14, PR15 and PR16 are connected in parallel and the six resistances R11, R12, R13, R14, R15, and R16 are connected in parallel between the point TXP and the power supply voltage Vcc. The resistances R11, R12, R13, R14, R15, and R16 may be 300Ω each. The resistance of a combined resistance Rcom1 of each resistances R11, R12, R13, R14, R15, and R16 may be 50Ω. All the PMOS transistors P21, P22, P23, P24, P25, and P26 of the data output circuit 25 and the emphasis control circuit 27 are in the off state, and all the NMOS transistors N21-N26 are in the on state. Therefore, the six second partial resistance circuits DR11, DR12, DR13, DR14, DR15, and DR16 are connected in parallel and the six resistances R41, R42, R43, R44, R45, and R46 are connected in parallel between the point TXM and the GND. The six resistances R41, R42, R43, R44, R45, and R46 may be 300Ω each. The resistance of a combined resistance Rcom2 of the resistances R41, R42, R43, R44, R45, and R46 may be 50Ω. If the power supply voltage Vcc is set to 1 V, the voltages of the points TXP and TXM may be 750 mV and 250 mV, respectively, and the voltage amplitude of the differential transmission line 4 may be 500 mV according to a dividing ratio of the combined resistances Rcom1 and Rcom2 and a dividing ratio of the terminating resistances R1 and R2. In this case, the constant current which flows from the point TXP to the point TXM is may be mA.

At the time of the pre-emphasis of data "0", the serial-data signal SDATAM is at a High level and the serial-data signal SDATAP is at a Low level, and the emphasis control signal EMPHM is at a High level and the emphasis control signal EMPHP is at a Low level. In this case, all the PMOS transistors P11, P12, P13, P14, P15, and P16 of the data generation circuit 24 and the emphasis control circuit 26 are in the off state, and all the NMOS transistors N11, N12, N13, N14, N15, and N16 are in the on state. Therefore, the point TXP is pulled down. All the PMOS transistors P21, P22, P23, P24, P25, and P26 of the data generation circuit 25 and the emphasis control circuit 27 are in the on state, and all the NMOS transistors N21-N26 are in the off state. Therefore, the point TXM is pulled up. Thus, the voltages of the points TXP and TXM may be 250 mV and 750 mV, respectively. As mentioned above, the combined resistances Rcom1 and Rcom2 may be 50Ω, respectively, realizing impedance adjustment of terminating resistance.

At the time of de-emphasis, the signal levels of the serial-data signal SDATAM and the emphasis control signal EMPHM differ, and the signal levels of the serial-data signal SDATAP and the emphasis control signal EMPHP differ. For example, at the time of the de-emphasis of data "1", the serial-data signal SDATAM is at a Low level and the serial-data signal SDATAP is at a High level, and the emphasis control signal EMPHM is at a Low level and the emphasis control signal EMPHP is at a High level. In this case, the PMOS transistors P11, P12, P13, P14, and P15 of the data generation circuit 24 are in the on state and the PMOS transistor P16 of the emphasis control circuit 26 is in the off state. The NMOS transistors N11, N12, N13, N14, and N15 of the data generation circuit 24 are in the off state and the NMOS transistor N16 of the emphasis control circuit 26 is in the on state.

Figure 7:
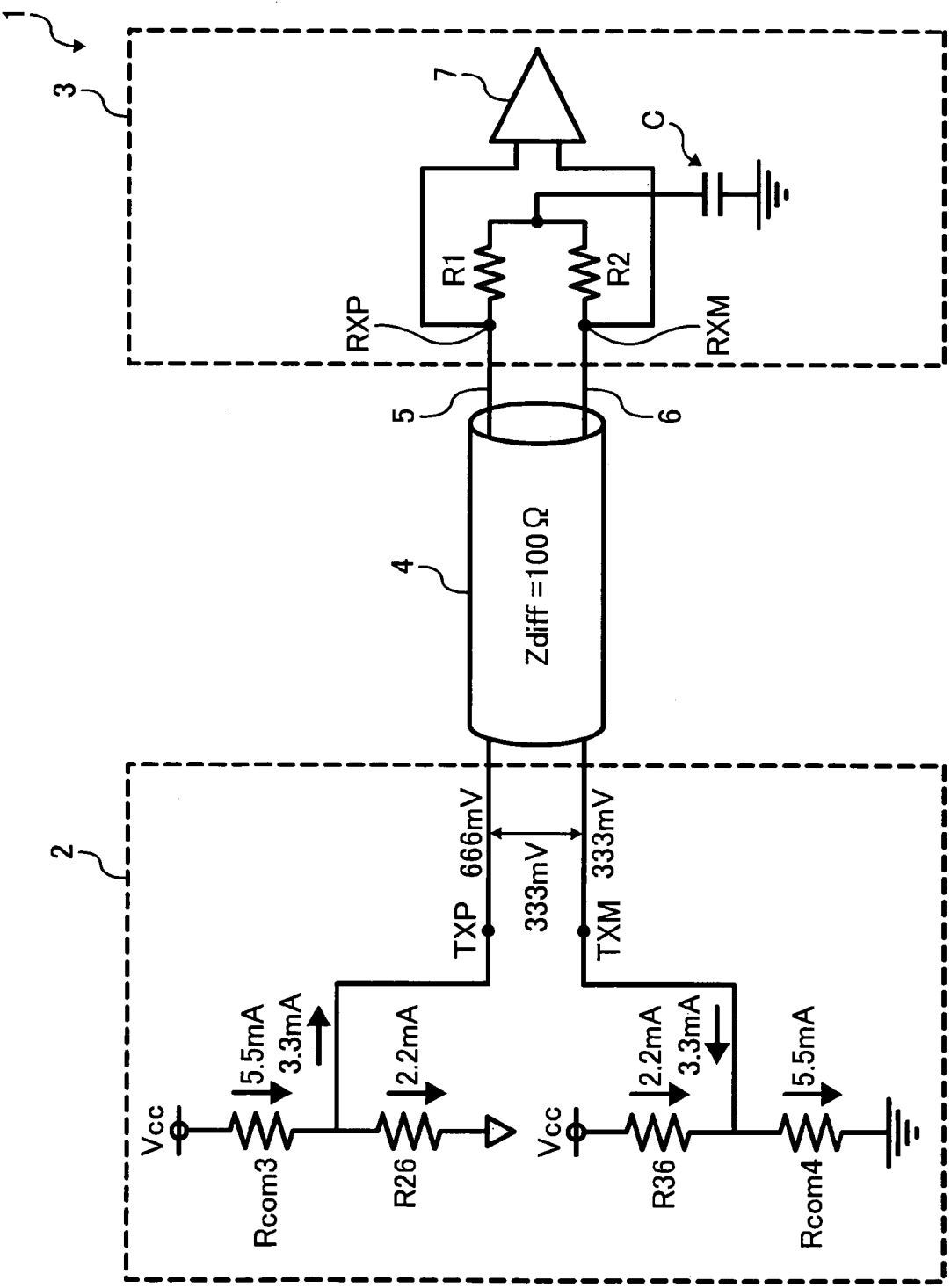
FIG. 7 is an illustration of the high-speed serial communications system of FIG. 3 at the time of the de-emphasis of data "1."

FIG. 7 is an illustration explaining an operating state of the high-speed serial communications system 1 at the time of the de-emphasis of data "1." As mentioned above, at the time of the de-emphasis of data "1", the PMOS transistors P11, P12, P13, P14, and P15 in the data output circuit 24 are in the on state and the NMOS transistors N11, N12, N13, N14, and N15 are in the off state. The PMOS transistor P16 of the emphasis control circuit 26 is in the off state and the NMOS transistor N16 is in the on state. Thus, the point TXP is connected to the GND through resistance R26, and is also connected with the power supply voltage Vcc through five resistances R21, R22, R23, R24, and R25 connected in parallel. The five resistances R21, R22, R23, R24, and R25 are connected in parallel between the point TXP and the power supply voltage Vcc. The resistance of each of the five resistances R21, R22, R23, R24, and R25 may be 300Ω and therefore, the value of the combined resistance Rcom3 of the resistances may be 60Ω. At the time of the de-emphasis of data "1", all the PMOS transistors P21, P22, P23, P24, and P25 in the data output circuit 25 are in the off state and all the NMOS transistors N21, N22, N23, N24, and N25 are in the on state. The PMOS transistor P26 of the emphasis control circuit 27 is in the on state and the NMOS transistor N26 is in the off state. Thus, the point TXM is connected to the power supply voltage Vcc through resistance R36, and also connects with the GND through the five resistances R41, R42, R43, R44, and R45 connected in parallel. The five resistances R41, R42, R43, R44, and R45 may be connected in parallel between the point TXM and the GND. Each of the five resistances R41, R42, R43, R44, and R45 may be 300Ω and therefore, a value of the combined resistance Rcom4 of the resistances R41-R45 may be 60Ω. If the power supply voltage Vcc is set to 1 V, the voltages of the points TXP and TXM may be 666 mV and 333 mV, respectively, and the voltage amplitude of the differential transmission line 4 may be 333 mV according to a dividing ratio of the combined resistances Rcom3 and Rcom4 and a dividing ratio of the terminating resistances R1 and R2. In this case, the current which flows to each terminating resistance R1 and R2 may be 3.3 mA. The current which flows to each the resistance R26 and R36 may be 2.2 mA. The current which flows to each combined resistance Rcom3 and Rcom4 may be 5.5 mA. When the power supply voltage Vcc of 1 V cannot be supplied from the exterior, such as may be the case when the transmitter circuit 2 and the receiver circuit 3 are constituted in an integrated circuit (IC), a regulator may be included in the IC.

The consumption current in the high-speed serial communications system 1 may be 5 mA at the time of a pre-emphasis and 7.77 mA at the time of de-emphasis which is a total of 2.22 mA in the TXP side and 5.55 mA in the TXM side. Therefore, the consumption current and the power consumption may also be reduced compared with the high-speed serial communications system of conventional PCI-Express.

The driver circuits 9 have a configuration such that the pull-up resistance circuit and the pull down resistance circuit include the partial resistance circuits connected in parallel in which the resistances and switching elements are connected in series. Each resistance of the pull-up resistance circuit and the pull down resistance circuit may be freely changed within the predetermined limits of by changing the number of the switching elements. Therefore, a driver circuit with emphasis control having small power consumption may be realized without using another current generator.

Furthermore, the resistances R11, R12, R13, R14, R15, and R16 in the driver circuit 9 are useful for protecting the transistors P11, P12, P13, P14, P15 and P16 from external static electricity. Therefore, the area of the drain electrodes of the MOS transistors P11, P12, P13, P14, P15 and P16 may be minimized according to a design rule of an integrated circuit. Reducing the drain area reduces a parasitic capacity, which may improve the speed of operation of the PMOS transistors P11, P12, P13, P14, P15 and P16. This principle may be applied to the resistances R21, R22, R23, R24, R25, and R26 corresponding to the NMOS transistors N11, N12, N13, N14, N15, and N16, the resistances R31, R32, R33, R34, R35, and R36 corresponding to the PMOS transistors P21, P22, P23, P24, P25, and P26, and the resistances R41, R42, R43, R44, R45, and R46 corresponding to the NMOS transistors N21, N22, N23, N24, N25, and N26.

Figure 8:
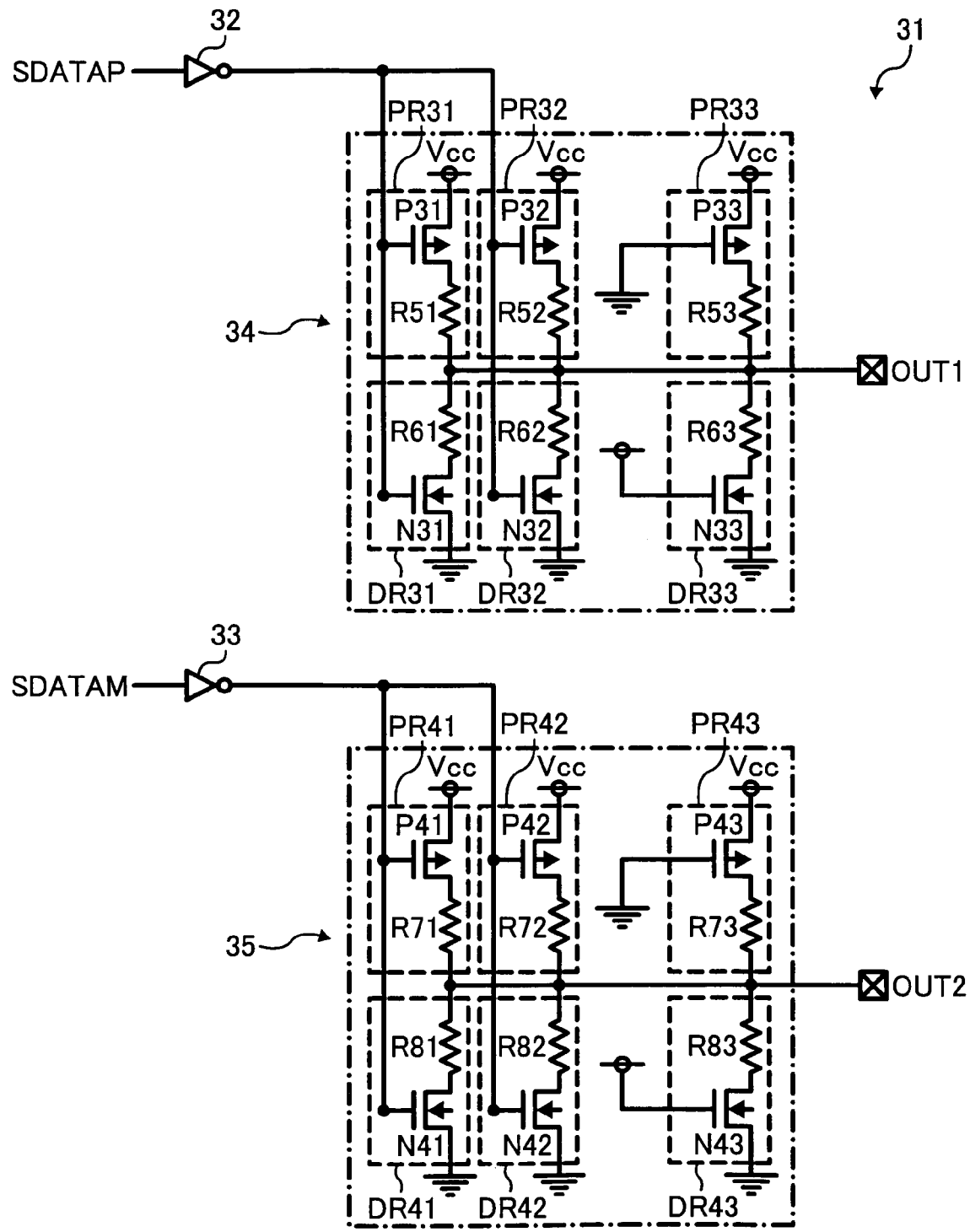
FIG. 8 illustrates a high-speed serial communications system of serial ATA according to an exemplary embodiment of the present invention.

In addition, the pull-up circuit and the pull down circuit may also be applied to a high-speed serial communications system of serial ATA. FIG. 8 illustrates an exemplary configuration of a transmitter driver circuit in the high-speed serial communications system of serial ATA according to an embodiment of the present invention. A driver circuit 31 includes two inverters 32 and 33 and two data generation circuits 34 and 35. The output ends of the inverters 32 and 33 are connected to the corresponding input ends of the data generation circuits 34 and 35, respectively. The output ends of the data generation circuits 34 and 35 are connected to the output ends OUT1 and OUT2, respectively. The driver circuit 31 shown in FIG. 8 does not have the emphasis function.

The data generation circuit 34 includes three first partial resistance circuits PR31, PR32, and PR33 connected in parallel between the output end OUT1 and the predetermined power supply voltage Vcc and three second partial resistance circuits DR31, DR32, and DR33 connected in parallel between the output end OUT1 and the GND. Each first partial resistance circuit of PR31-33 has the same configuration. Each second partial resistance circuit of DR31, DR32, and DR33 has the same configuration. The first partial resistance circuit PR31 has a configuration in which a PMOS transistor P31 and a resistance R51 are connected in series. The second partial resistance circuit DR31 has a configuration in which an NMOS transistor N31 and a resistance R61 are connected in series. A gate of the PMOS transistor P33 is connected to the GND, and a gate of the NMOS transistor N33 is connected to the power supply voltage Vcc. The gates of the transistors P31, P32, N31, and N32 are connected to the output ends of the inverter 32.

The data generation circuit 35 includes three first partial resistance circuits PR41, PR42, and PR43 connected in parallel between the output end OUT2 and the predetermined power supply voltage Vcc. The data generation circuit 35 also includes three second partial resistance circuits DR41, DR42, and DR43 connected in parallel between the output end OUT2 and the GND. Each first partial resistance circuit of PR41, PR42, and PR43 has the same configuration. Each second partial resistance circuit of DR41, DR42, and DR43 has the same configuration. The first partial resistance circuit PR41 has a configuration in which a PMOS transistor P41 and a resistance R71 are connected in series. The second partial resistance circuit DR41 has a configuration in which an NMOS transistor N41 and a resistance R81 are connected in series. A gate of the PMOS transistor P43 is connected to the GND, and a gate of the NMOS transistor N43 is connected to the power supply voltage Vcc. The gates of the transistors P41, P42, N41, and N42 are connected to the output end of the inverter 33.

For example, each resistance of the resistances R51, R52, R53, R61, R62, R63, R71, R72, R73, R81, R82, and R38 may be 200Ω. The PMOS transistors P33 and P43 are always in the on state regardless of the signal level of the serial-data signals SDATAP and SDATAM. The NMOS transistors N33 and N43 are always in the on state regardless of the signal level of the serial-data signals SDATAP and SDATAM.

When the serial-data signal SDATAP is at a High level and the serial-data signal SDATAM is at a Low level, the PMOS transistors P31 and P32 of the data generation circuit 34 are in the on state and the NMOS transistors N31 and N32 are in the off state. The PMOS transistors P41 and P42 of the data generation circuit 35 are in the off state and the NMOS transistors N41 and N42 are in the on state. The resistances R51, R52, and R53 are connected in parallel between the output end OUT1 and the power supply voltage Vcc, and the resistance R63 is connected between the output end OUT1 and the GND. The resistances R51, R52, and R53 may each be 200Ω). The resistances R81, R82, and R83 are connected to in parallel between the output end OUT2 and the GND, and the resistance R73 is connected between the output end OUT2 and the power supply voltage Vcc.

Figure 9:
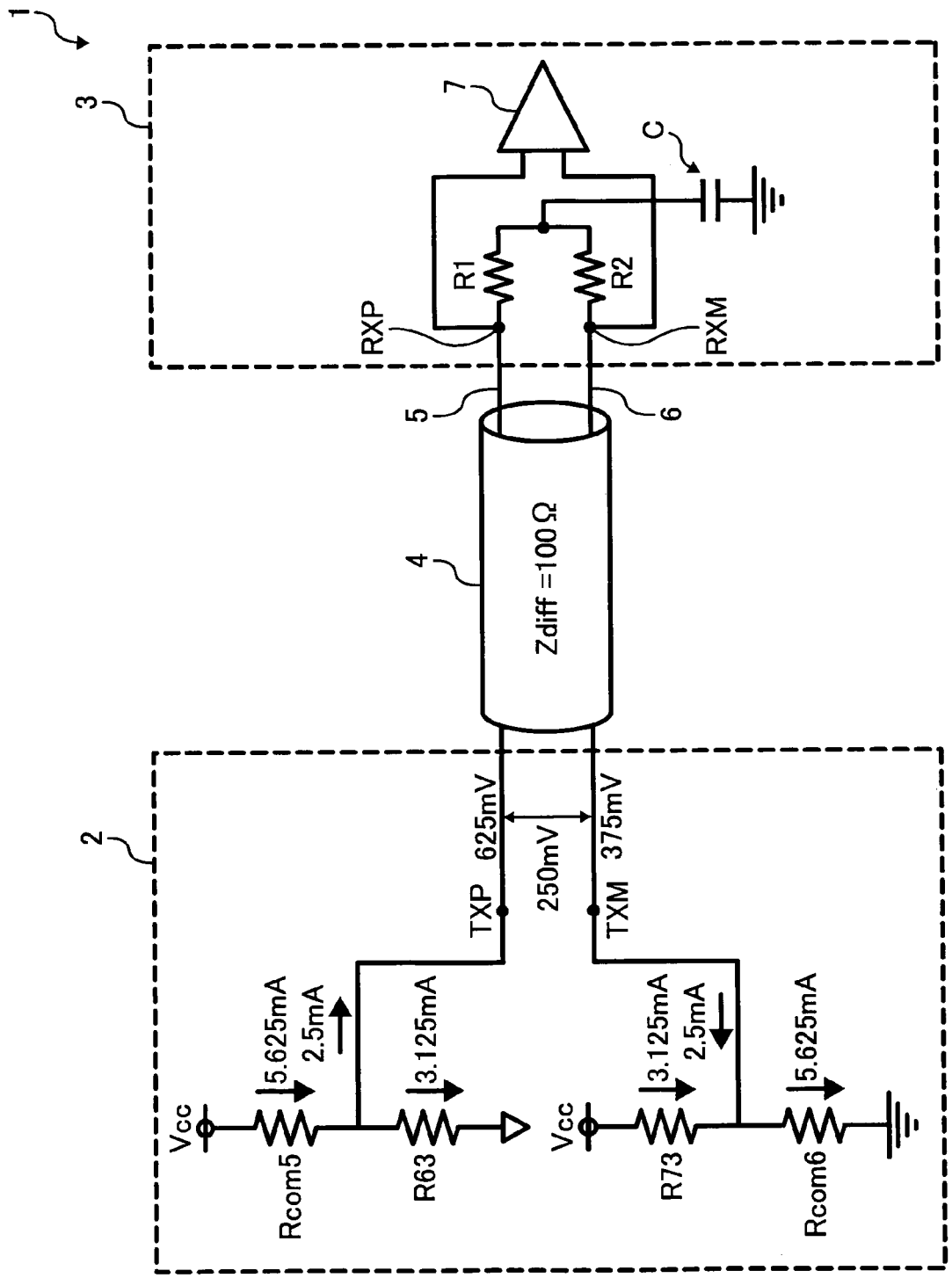
FIG. 9 is an illustration of the high-speed serial communications system of FIG. 8.

FIG. 9 is an illustration explaining an operating state of the high-speed serial communications system 31 of serial ATA. As shown in FIG. 9, the three resistances R51, R52, and R53 are connected in parallel between a point TXP and the power supply voltage Vcc. The three resistances R51, R52, and R53 may each be 200Ω, and therefore, a combined resistance Rcom5 of the resistances R51, R52, and R53 may be 200/3Ω. The three resistances R81, R82, and R83 are connected in parallel between a point TXM and the GND. The three resistances R81, R82, and R83 may each be 200Ω, and therefore, a combined resistance Rcom6 of the resistances R81, R82, and R83 may be 200/3Ω. If the power supply voltage Vcc is set to 1 V, the voltages of the points TXP and TXM may be 625 mV and 375 mV, respectively, and the voltage amplitude of the differential transmission line 4 may be 250 mV according to a dividing ratio of the combined resistances Rcom5 and Rcom6 and a dividing ratio of the terminating resistances R1 and R2. In this case, the current which flows to each terminating resistance R1 and R2 may be 2.5 mA. The current which flows to each the resistance R63 and R73 may be 3.125 mA. The current which flows to each combined resistance Rcom5 and Rcom6 may be 5.625 mA. When the serial-data signal SDATAP is at a Low level and the serial-data signal SDATAM is at a High level, the voltage of the points TXP and TXM may be 375 mV and 625 mV, respectively, and the voltage amplitude of the differential transmission line 4 may be 250 mV.

As mentioned above, since the differential voltage of 250 mV may be realized in the differential transmission line 4, the driver circuit using the pull-up resistance circuit and the pull down resistance circuit of this invention may also be applied to the high-speed serial communications system of serial ATA. A desired voltage amplitude may be realized by changing the internal circuit configuration without a desired power supply voltage from the outside. Thus, the development period of a product may be shortened.

Another embodiment of this invention will now be described. The driver circuit 9 of FIG. 3 in this embodiment differs from the driver circuit 9 in the above embodiment in the configuration of the first and second partial resistance circuits. In the driver circuit 9 of this embodiment, the first partial resistance circuit PR11, PR12, PR13, PR14, PR15, PR16, PR21, PR22, PR23, PR24, PR25, and PR26 and each second partial resistance circuit DR11, DR12, DR13, DR14, DR15, DR16, DR21, DR22, DR23, DR24, DR25, and DR26 are chosen from two or more resistance circuits. Variation in the resistance and the switching element may be caused during a manufacturing process, and the variation may affect the resistance of the partial resistance circuits. In order to maintain the accuracy of each resistance to avoid the variation, the resistances of the first and second partial resistance circuits PR11, PR12, PR13, PR14, PR15, PR16, PR21, PR22, PR23, PR24, PR25, PR26, DR11, DR12, DR13, DR14, DR15, DR16, DR21, DR22, DR23, DR24, DR25, and DR26 are held to corresponding predetermined resistances.

Figure 10:
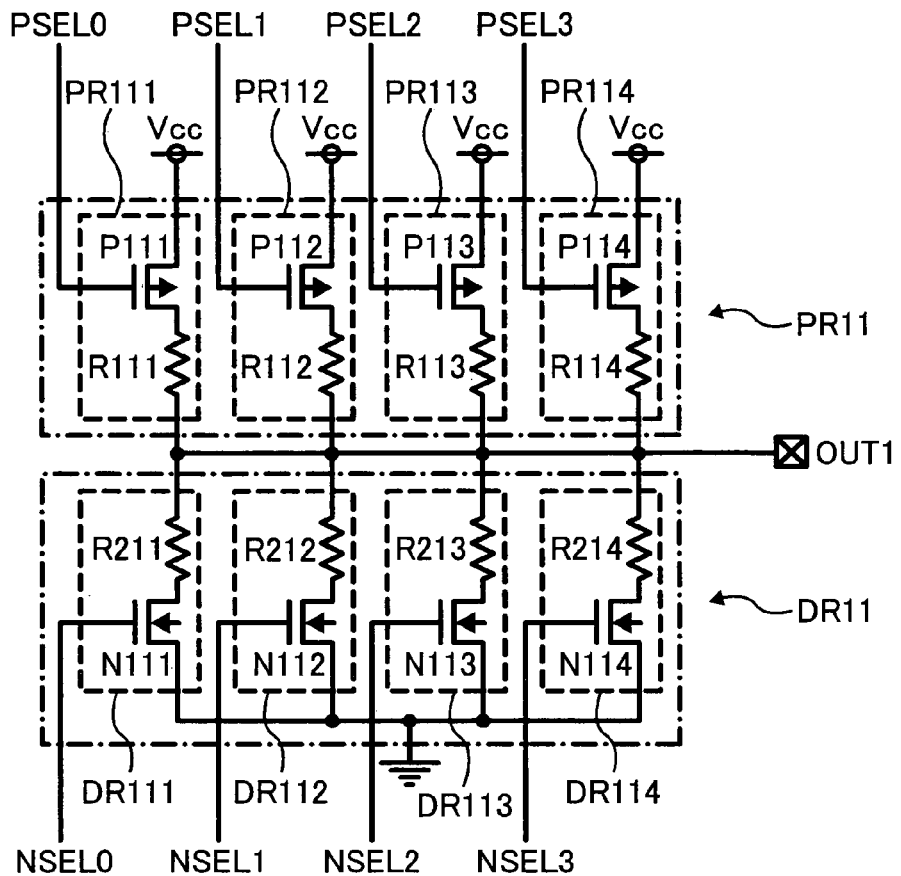
FIG. 10 illustrates an exemplary circuit which can select a partial resistance circuit of FIG. 4 from two or more resistance circuits.

FIG. 10 illustrates an example of a circuit which enables the selection of the first partial resistance circuit PR11 and the second partial resistance circuit DR11 shown in FIG. 4 from two or more resistance circuits. As shown in FIG. 10, the four first resistance circuits PR111, PR112, PR113, and PR114 are connected in parallel between the output end OUT1 and the power supply voltage Vcc. The four second resistance circuits DR111, DR112, DR113, and DR114 are connected in parallel between the output end OUT1 and the GND. Each first partial resistance circuit of PR111, PR112, PR113, and PR114 has the same configuration. Each second partial resistance circuit of DR111, DR112, DR113, and DR114 has the same configuration. The first partial resistance circuit PR111 has a configuration in which a PMOS transistor P111 and a pull-up resistance R111 are connected in series. The second partial resistance circuit DR111 has a configuration in which an NMOS transistor N111 and a pull down resistance R211 are connected in series. Each pull-up resistance R111, R112, R113, and R114 may be set to have different resistances. Each pull down resistance R211, R212, R213, and R214 may be set to have different resistances. Here, resistances r111, r112, r113, and r114 of the pull-up resistances R111, R112, R113, and R114, respectively, and resistances r211, r212, r213, and r214 of the pull down resistances R211, R212, R213, and R214, respectively, are set up to take manufacturing variations of the corresponding pull-up resistance R11 and the pull down resistance R21 into consideration. For example, in a case where the desired resistance of the pull down resistance R21 is 300Ω, and when an error of ±20% may arise during manufacturing, the resistances r211, r212, r213, and r214 of the pull down resistance Rm may be set up within the limits of 240 to 360Ω. For example, the resistances of the pull down resistances R211, R212, R213, and R214 may be set to 250Ω, 290Ω, 310Ω, and 350Ω, respectively. Control signals PSEL0, PSEL1, PSEL2, and PSEL3 are input into the NMOS transistors P111, P112, P113, and P114, respectively. Control signals NSEL0, NSEL1, NSEL2, and NSEL3 are input into the NMOS transistors N111, N112, N113, and N114, respectively. The transistors P111, P112, P113, P114, N111, N112, N113, and N114 perform an ON/OFF operation according to a signal level of the control signals PSEL0, PSEL1, PSEL2, and PSEL3 and NSEL0, NSEL1, NSEL2, and NSEL3.

Figure 11:
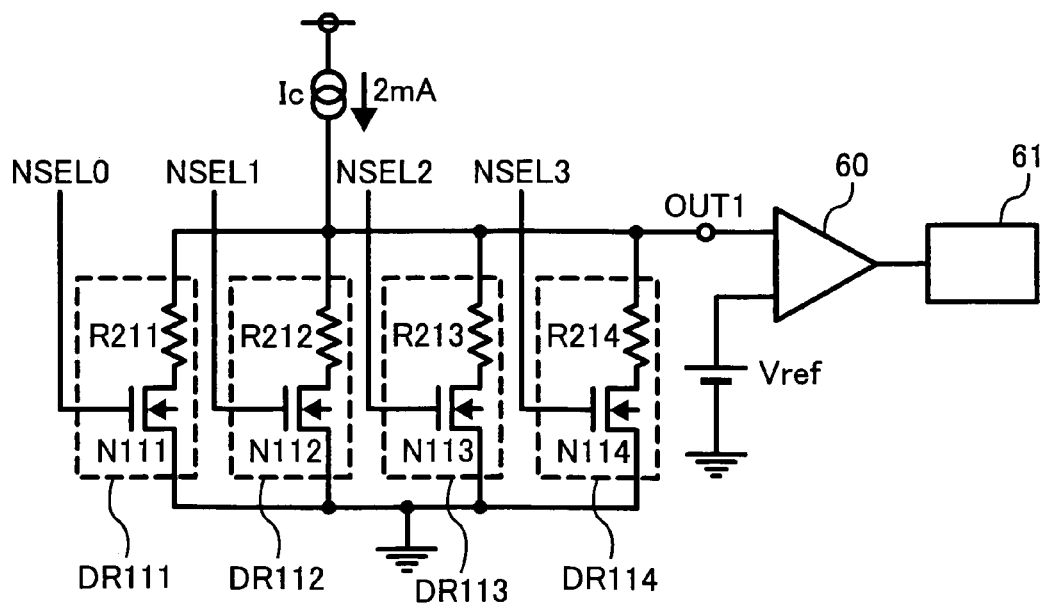
FIG. 11 is an illustration of an exemplary configuration which can choose the most suitable resistance circuit from the two or more resistance circuits of FIG. 10.

FIG. 11 is an illustration of an exemplary configuration which chooses the most suitable resistance circuit from the two or more resistance circuits DR111-DR114 of FIG. 10. As shown in FIG. 11, the selecting circuit includes a current generator Ic, a comparator 60, and a detector circuit 61. The selecting operation is performed by using an external selecting circuit before the operation of the driver circuit 9. For example, in a case where the desired resistance of the partial resistance circuit DR11 is 300Ω, a constant current of about 2 mA flows to each second resistance circuit DR111, DR112, DR113, and DR114 from the current generator Ic. The comparator 60 compares the voltage generated by each second resistance circuit DR111, DR112, DR113, and DR114 and the reference voltage Vref of 600 mV in the order of turning on the NMOS transistors N111, N112, N113, and N114 corresponding to the control signals NSEL0, NSEL1, NSEL2, and NSEL3 in a High level. The detector circuit 61 detects a change of the signal level of the output signal of the comparator 60. The resistance circuit corresponding to the generating voltage, which is compared at a time of changing the signal level of the output signal of the comparator 60, is chosen as a partial resistance circuit DR11. Thus, a resistance circuit nearest to 300Ω may be chosen as the partial resistance circuit DR11. An ON/OFF operation is then performed only on the NMOS transistor of the selected resistance circuit. This selecting operation is performed before actually transmitting data with the serial communications system 1.

Therefore, as mentioned above, even if variations exist in resistances or in switching elements due to a manufacture process, the resistance of the partial resistance circuit may be kept close to a predetermined value by choosing one resistance circuit from two or more resistance circuits as a partial resistance circuit. As a result, the accuracy of impedance adjustment of the differential transmission line 4 and the waveform quality of the differential signal may be improved. The driver circuit 9 of this embodiment may therefore improve the waveform quality of a differential signal and may be used in addition to the effects with the driver circuit 9 of the former example.

Figure 12:
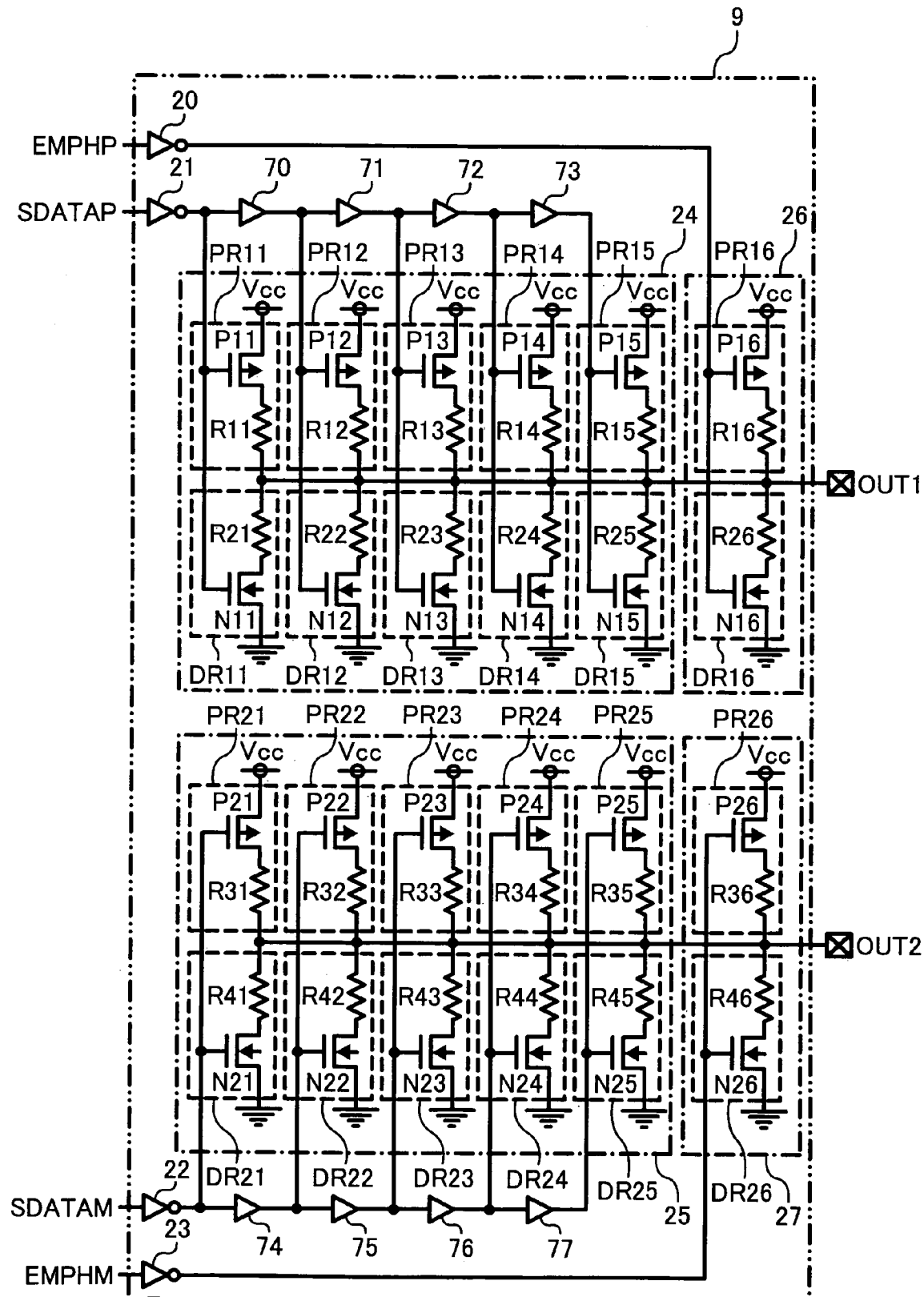
FIG. 12 illustrates an exemplary configuration of the driver circuit of FIG. 3.

FIG. 12 illustrates another exemplary configuration of the driver circuit 9 of FIG. 3. In this driver circuit 9, a buffer 70 is connected between the output end of the inverter 21 and a point connected to the gates of the PMOS transistor P12 and the NMOS transistor N12 of FIG. 4. A buffer 71 is connected between the output end of the inverter 21 and a point connected to the gates of the PMOS transistor P13 and the NMOS transistor N13 of FIG. 4. A buffer 72 is connected between the output end of the inverter 21 and a point connected to the gates of the PMOS transistor P14 and the NMOS transistor N14 of FIG. 4. A buffer 73 is connected between the output end of the inverter 21 and a point connected to the gates of the PMOS transistor P15 and the NMOS transistor N15 of FIG. 4. A buffer 74 is connected between the output end of the inverter 22 and a point connected to the gates of the PMOS transistor P22 and the NMOS transistor N22 of FIG. 4. A buffer 75 is connected between the output end of the inverter 22 and a point connected to the gates of the PMOS transistor P23 and the NMOS transistor N23 of FIG. 4. A buffer 76 is connected between the output end of the inverter 22 and a point connected to the gates of the PMOS transistor P24 and the NMOS transistor N24 of FIG. 4. A buffer 77 is connected between the output end of the inverter 22 and a point connected to the gates of the PMOS transistor P25 and the NMOS transistor N25 of FIG. 4.

When the differential data output from the driver circuit 9 changes from "1" to "0", that is, when the output signal of the inverter 21 changes from a High level to a Low level and the output signal of the inverter 22 changes from a Low level to a High level, the PMOS transistors P11, P12, P13, P14, and P15 turn on with a very small delay and the NMOS transistors N11, N12, N13, N14, and N15 turn off with a very small delay due to the buffers 70, 71, 72, and 73. The PMOS transistors P21, P22, P23, P24, and P25 also turn on with a very small delay and the NMOS transistors N21, N22, N23, N24, and N25 also turn off with a very small delay due to the buffers 74, 75, 76, and 77. Generally, at the time when the differential data changes, the signal quality of the differential signal output from the driver circuit 9 tends to deteriorate due to a switching noise or mismatching of impedance, etc. The driver circuit 9 of this invention may be used to adjust a slew rate of the output signal of the inverters 21 and 22, and deterioration of signal quality may be prevented. The same result can be achieved when the differential data output from the driver circuit 9 changes from "0" to "1."

The driver circuit 9 may therefore improve the characteristics of a signal waveform of the output differential signal.

The driver circuit 9 of this embodiment may be used to improve the waveform quality of a differential signal in addition to the effects of the driver circuit 9 of the other embodiments.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. A driver circuit of a serial communications system for converting an input data signal into a differential signal, comprising:

a first pullup resistance circuit connected to a power source voltage and configured to vary a resistance value thereof in accordance with a first input data signal;

a second pullup resistance circuit connected to a power source voltage and configured to vary a resistance value thereof in accordance with a second input data signal;

a third pullup resistance circuit connected to a power source voltage and configured to vary a resistance value thereof in accordance with a first control signal;

a fourth pullup resistance circuit connected to a power source voltage and configured to vary a resistance value thereof in accordance with a second control signal;

a first pulldown resistance circuit connected to a ground voltage and configured to vary a resistance value thereof in accordance with the first input data signal;

a second pulldown resistance circuit connected to a ground voltage and configured to vary a resistance value thereof in accordance with the second input data signal;

a third pulldown resistance circuit connected to a ground voltage and configured to vary a resistance value thereof in accordance with the first control signal;

a fourth pulldown resistance circuit connected to a ground voltage and configured to vary a resistance value thereof in accordance with the second control signal;

a first output terminal connected to a first transmission line, the first pullup resistance circuit, the first pulldown resistance circuit, the third pullup resistance circuit, and the third pulldown resistance circuit; and a second output terminal connected to a second transmission line, the second pullup resistance circuit, the second pulldown resistance circuit, the fourth pullup resistance circuit, and the fourth pulldown resistance circuit, wherein the first and second transmission lines transmit the differential signal, wherein the first control signal is independent of the first and second input data signals, and wherein the second control signal is independent of the first and second input data signals.

2. The driver circuit of claim 1, wherein the first pullup resistance circuit comprises a plurality of first partial resistance circuits connected in parallel between the power source voltage and the first output terminal, wherein the second pullup resistance circuit comprises a plurality of first partial resistance circuits connected in parallel between the power source voltage and the second output terminal, wherein the first partial resistance circuits comprise a first switching element, and a first resistance connected in series to the first switching element, wherein the resistance of each of the plurality of first partial resistance circuits is varied by switching its corresponding first switching element between on and off states in accordance with the first input data signal or second input data signal, wherein the first pulldown resistance circuit comprises a plurality of second partial resistance circuits connected in parallel between the ground voltage and the first output terminal, wherein the second pulldown resistance circuit comprises a plurality of second partial resistance circuits connected in parallel between the ground voltage and the second output terminal, wherein the second partial resistance circuits comprise a second switching element, and a second resistance connected in series to the second switching element, and wherein the resistance of each of the plurality of second partial resistance circuits is varied by switching its corresponding second switching element between on and off states in accordance with the first input data signal or second input data signal.

3. The driver circuit of claim 2, wherein the first switching elements included in the plurality of first pullup resistance circuits switch between on and off states at a predetermined time lag, wherein the first switching elements included in the plurality of second pullup resistance circuits switch between on and off states at the predetermined time lag, wherein the second switching elements included in the plurality of first pulldown resistance circuits switch between on and off states at the predetermined time lag, and wherein the second switching elements included in the plurality of second pulldown resistance circuits switch between on and off states at the predetermined time lag.

4. The driver circuit of claim 2, wherein at least one of the first switching elements and at least one of the second switching elements remain in the on state.

5. The driver circuit of claim 2, wherein any one of the plurality of first partial resistance circuits and the plurality of second partial resistance circuits may be selected by an external selecting circuit.

6. The driver circuit of claim 2, wherein the third pullup resistance circuit comprises at least one third partial resistance circuit, wherein the fourth pullup resistance circuit comprises at least one third partial resistance circuits, wherein the third partial resistance circuits comprise a third switching element, and a third resistance connected in series with the third switching element, wherein the resistance of each of the third partial resistance circuits is varied by switching its corresponding third switching element to switch between on and off states in accordance with the first control signal or the second control signal, wherein the third pulldown resistance circuit comprises at least one fourth partial resistance circuit, wherein the fourth pulldown resistance circuit comprises at least one fourth partial resistance circuit, wherein the fourth partial resistance circuits comprise a fourth switching element, and a fourth resistance connected in parallel with the fourth switching element, and wherein the resistance of each of the fourth partial resistance circuits is varied by switching its corresponding fourth switching element to switch between on and off states in accordance with the first control signal or the second control signal.

7. A driver circuit of a serial communications system for converting an input data signal into a differential signal and adjusting the slew rate of the differential signal and preventing the deterioration of signal quality, comprising:

a first pullup resistance circuit comprising first, second, and third partial resistance circuits connected in parallel between a power source voltage and a first output terminal and configured to vary a resistance value of the power source voltage in accordance with a first input data signal, wherein the first input data signal is buffered by a first buffer before being provided to the second partial resistance circuit and the first input data signal is buffered by the first buffer and a second buffer before being provided to the third partial resistance circuit;

a second pullup resistance circuit comprising fourth, fifth, and sixth partial resistance circuits connected in parallel between the power source voltage and a second output terminal and configured to vary a resistance value of the power source voltage in accordance with a second input data signal, wherein the second input data signal is buffered by a third buffer before being provided to the fifth partial resistance circuit and the second input data signal is buffered by the third buffer and a fourth buffer before being provided to the sixth partial resistance circuit;

a third pullup resistance circuit connected to a power source voltage and configured to vary a resistance value thereof in accordance with a first control signal;

a fourth pullup resistance circuit connected to a power source voltage and configured to vary a resistance value thereof in accordance with a second control signal;

a first pulldown resistance circuit comprising seventh, eighth, and ninth partial resistance circuits connected in parallel between a ground voltage and the first output terminal and configured to vary a resistance value of the ground voltage in accordance with the first input data signal, wherein the first input data signal is buffered by the first buffer before being provided to the eighth partial resistance circuit and the first input data signal is buffered by the first buffer and the second buffer before being provided to the ninth partial resistance circuit;

a second pulldown resistance circuit comprising tenth, eleventh, and twelfth partial resistance circuits connected in parallel between the ground voltage and the second output terminal and configured to vary a resistance value of the ground voltage in accordance with the second input data signal, wherein the second input data signal is buffered by the third buffer before being provided to the eleventh partial resistance circuit and the second input data signal is buffered by the third buffer and the fourth buffer before being provided to the twelfth partial resistance circuit;

a third pulldown resistance circuit connected to a ground voltage and configured to vary a resistance value thereof in accordance with the first control signal; and a fourth pulldown resistance circuit connected to a ground voltage and configured to vary a resistance value thereof in accordance with the second control signal, wherein the first output terminal is connected to a first transmission line, the first pullup resistance circuit, the first pulldown resistance circuit, the third pullup resistance circuit, and the third pulldown resistance circuit, and wherein the second output terminal is connected to a second transmission line, the second pullup resistance circuit, the second pulldown resistance circuit, the fourth pullup resistance circuit, and the fourth pulldown resistance circuit, wherein the first and second transmission lines transmit the differential signal.

8. The driver circuit of claim 7, wherein the partial resistance circuits each comprise a switching element, and a resistance connected in series to the switching element, and wherein the resistance of each of the first through twelfth partial resistance circuits is varied by switching its corresponding first switching element between on and off states in accordance with the first input data signal or second input data signal.

9. The driver circuit of claim 8, wherein the switching elements included in the first through twelfth partial resistance circuits are switch between on and off states at a predetermined time lag.

10. The driver circuit of claim 8, wherein at least one of the switching elements of the first through sixth partial resistance circuits and at least one of the switching elements of the seventh through twelfth partial resistance circuits remain in the on state.

11. The driver circuit of claim 8, wherein any one of the first through twelfth partial resistance circuits may be selected by an external selecting circuit.

12. The driver circuit of claim 8, wherein the third pullup resistance circuit comprises a thirteenth partial resistance circuit, wherein the fourth pullup resistance circuit comprises a fourteenth partial resistance circuit, wherein the third pulldown resistance circuit comprises a fifteenth partial resistance circuit, wherein the fourth pulldown resistance circuit comprises a sixteenth partial resistance circuit, wherein the thirteenth through sixteenth partial resistance circuits each comprise a switching element and a resistance connected in series with the switching element, and wherein the resistance of each of the thirteenth through sixteenth partial resistance circuits is varied by switching its corresponding switching element to switch between on and off states in accordance with the first control signal or the second control signal.

13. A driver circuit of a serial communications system for converting an input data signal into a differential signal, comprising: a first pullup resistance circuit connected to a power source voltage and configured to vary a resistance value thereof in accordance with a first input data signal, the first pullup resistance circuit comprising a plurality of first pullup partial resistance circuits arranged in parallel between the power source voltage and a first output terminal, wherein the plurality of first pullup partial resistance circuits each comprise a PMOS transistor and a resistor arranged in series; a first pulldown resistance circuit connected to a ground voltage and configured to vary a resistance value thereof in accordance with the first input data signal, the first pulldown resistance circuit comprising a plurality of first pulldown partial resistance circuits arranged in parallel between the ground voltage and the first output terminal, wherein the plurality of first pulldown partial resistance circuits each comprise an NMOS transistor and a resistor, arranged in series; a first inverter having an input end that inputs the first input data signal and an output end that outputs an inverted first input data signal; a first buffer connected between the output end of the first inverter and a point connected to gates of the PMOS transistors of the first pullup partial resistance circuits and gates of the NMOS transistors of the first pulldown partial resistance circuits; a second pullup resistance circuit connected to a power source voltage and configured to vary a resistance value thereof in accordance with a second input data signal, the second pullup resistance circuit comprising a plurality of second pullup partial resistance circuits arranged in parallel between the power source Voltage and a second output terminal, wherein the plurality of second pullup partial resistance circuits each comprise a PMOS transistor and a resistor arranged in series; a second pulldown resistance circuit connected to a ground voltage and configured to vary a resistance value thereof in accordance with the second input data signal, the second pulldown resistance circuit comprising a plurality of second pulldown partial resistance circuits arranged in parallel between the ground voltage and the second output terminal, wherein the plurality of second pulldown partial resistance circuits each comprise an NMOS transistor and a resistor arranged in series; a second inverter having an input end that inputs the second input data signal and an output end that outputs an inverted second input data signal; a second buffer connected between the output end of the second inverter and a point connected to gates of the PMOS transistors of the second pullup partial resistance circuits and gates of the NMOS transistors of the second pulldown partial resistance circuits; a third pullup resistance circuit connected to a power source voltage and configured to vary a resistance value thereof in accordance with a first control signal; a fourth pullup resistance circuit connected to a power source voltage and configured to vary a resistance value thereof in accordance with a second control signal; a third pulldown resistance circuit connected to a ground voltage and configured to vary a resistance value thereof in accordance with the first control signal; and a fourth pulldown resistance circuit connected to a ground voltage and configured to vary a resistance value thereof in accordance with the second control signal; wherein the first output terminal is connected to a first transmission line, the first pullup resistance circuit, the first pulldown resistance circuit, the third pullup resistance circuit, and the third pulldown resistance circuit, wherein the second output terminal is connected to a second transmission line, the second pullup resistance circuit, the second pulldown resistance circuit, the fourth pullup resistance circuit, and the fourth pulldown resistance circuit, and wherein the first and second transmission lines transmit the differential signal.

14. The driver circuit of claim 13, wherein the resistance of each of the plurality of first pullup partial resistance circuits is varied by switching its corresponding PMOS transistor between on and off states in accordance with the first input data signal,
   wherein the resistance of each of the plurality of first pulldown partial resistance circuits is varied by switching its corresponding NMOS transistor between on and off states in accordance with the first input data signal,
   wherein the resistance of each of the plurality of second pullup partial resistance circuits is varied by switching its corresponding PMOS transistor between on and off states in accordance with the second input data signal, and
   wherein the resistance of each of the plurality of second pulldown partial resistance circuits is varied by switching its corresponding NMOS transistor between on and off states in accordance with the second input data signal.

15. The driver circuit of claim 14, further comprising a plurality of first buffers connected between the output end of the first inverter and a point connected to one or more gates of the PMOS transistors of the first pullup partial resistance circuits and one or more gates of the NMOS transistors of the first pulldown partial resistance circuits, and a plurality of second buffers connected between the output end of the second inverter and a point connected to one or more gates of the PMOS transistors of the second pullup partial resistance circuits and one or more gates of the NMOS transistors of the second pulldown partial resistance circuits.

16. The driver circuit of claim 14, wherein at least one of the transistors in the first pullup resistance circuits and first pulldown resistance circuits or the second pullup resistance circuits and second pulldown resistance circuits remain in the on state.

17. The driver circuit of claim 14, wherein any one of the first pullup resistance circuits and first pulldown resistance circuits, and the second pullup resistance circuits and second pulldown resistance circuits may be selected by an external selecting circuit.

18. The driver circuit of claim 14,
   wherein the third pullup resistance circuit comprises at least one third partial resistance circuit,
   wherein the fourth pullup resistance circuit comprises at least one third partial resistance circuits,
   wherein the third partial resistance circuits comprise a third switching element, and a third resistance connected in series with the third switching element,
   wherein the resistance of each of the third partial resistance circuits is varied by switching its corresponding third switching element to switch between on and off states in accordance with the first control signal or the second control signal,
   wherein the third pulldown resistance circuit comprises at least one fourth partial resistance circuit,
   wherein the fourth pulldown resistance circuit comprises at least one fourth partial resistance circuit,
   wherein the fourth partial resistance circuits comprise a fourth switching element, and a fourth resistance connected in parallel with the fourth switching element, and
   wherein the resistance of each of the fourth partial resistance circuits is varied by switching its corresponding fourth switching element to switch between on and off states in accordance with the first control signal or the second control signal.

* * * * *